United States Patent
Nakarai et al.

(10) Patent No.: US 8,647,015 B2
(45) Date of Patent: Feb. 11, 2014

(54) ARTIFICIAL MULTI-BARRIER FOR A RADIOACTIVE WASTE TREATMENT FACILITY

(75) Inventors: Kenichiro Nakarai, Gunma (JP); Kiyoshi Koibuchi, Kanagawa (JP); Nobukazu Nito, Kanagawa (JP)

(73) Assignees: Gunma University, Gunma (JP); DC Co., Ltd., Kanagawa (JP)

( * ) Notice: Subject to any disclaimer, the term of this patent is extended or adjusted under 35 U.S.C. 154(b) by 173 days.

(21) Appl. No.: 12/997,703

(22) PCT Filed: Jun. 15, 2009

(86) PCT No.: PCT/JP2009/002698
§ 371 (c)(1),
(2), (4) Date: Dec. 13, 2010

(87) PCT Pub. No.: WO2009/153957
PCT Pub. Date: Dec. 23, 2009

(65) Prior Publication Data
US 2011/0097155 A1      Apr. 28, 2011

(30) Foreign Application Priority Data

Jun. 19, 2008    (JP) .................................. 2008-160161

(51) Int. Cl.
*B09B 1/00*          (2006.01)
*E02D 31/00*         (2006.01)
*G21F 1/00*          (2006.01)

(52) U.S. Cl.
USPC ........................................ 405/129.45; 588/16

(58) Field of Classification Search
USPC ......... 405/55, 129.45, 129.55, 129.6, 129.95, 405/266–268; 588/16, 17
See application file for complete search history.

(56) References Cited

U.S. PATENT DOCUMENTS

| | | | | |
|---|---|---|---|---|
| 2,878,133 | A | * | 3/1959 | Uccelli .......................... 106/673 |
| 4,378,249 | A | * | 3/1983 | Beale et al. ................... 106/607 |
| 4,464,081 | A | * | 8/1984 | Hillier et al. .................. 588/259 |

(Continued)

FOREIGN PATENT DOCUMENTS

| | | |
|---|---|---|
| JP | 2000-063114 A | 2/2000 |
| JP | 2002-250795 A | 9/2002 |

(Continued)

OTHER PUBLICATIONS

Masaki Watanabe et al., "Effect of Dry Density of Bentonite in Contact with Concrete on Its Alteratin After Electrical Migration", Cement Science and Concrete Technology, No. 61, 2007, Feb. 20, 2008, pp. 351-357.

(Continued)

*Primary Examiner* — John Kreck
*Assistant Examiner* — Stacy Warren
(74) *Attorney, Agent, or Firm* — Pearne & Gordon LLP

(57) ABSTRACT

A concrete pit containing radioactive waste is surrounded by a low diffusion layer of cement-based material, which in turn, is surrounded by a low water permeability layer of sodium-type bentonite and the leaching out of calcium ions from the low water permeability layer is inhibited by mixing sodium bicarbonate or sodium carbonate with the sodium-type bentonite/sand mixture of the low water-permeability layer so that leached calcium ions form a barrier layer having calcium carbonate as the main component in the vicinity of the interface between the layers.

12 Claims, 6 Drawing Sheets

(56) References Cited

U.S. PATENT DOCUMENTS

| | | | | |
|---|---|---|---|---|
| 4,696,698 | A | * | 9/1987 | Harriett ........................ 106/624 |
| 4,997,695 | A | * | 3/1991 | Clem .............................. 428/76 |
| 5,125,532 | A | * | 6/1992 | Casagrande ............... 220/62.15 |
| 5,169,566 | A | * | 12/1992 | Stucky et al. ................. 264/255 |
| 5,948,156 | A | * | 9/1999 | Coutelle et al. ............... 106/486 |
| 6,340,385 | B1 | * | 1/2002 | Wammes ................. 106/287.17 |
| 7,026,385 | B2 | * | 4/2006 | Wammes et al. ............. 524/446 |
| 2009/0022550 | A1 | * | 1/2009 | Roesler et al. ................ 405/268 |

FOREIGN PATENT DOCUMENTS

| | | | |
|---|---|---|---|
| JP | 2006-083354 | A | 3/2006 |
| JP | 2006-248887 | A | 9/2006 |
| JP | 2007-050381 | A | 3/2007 |
| JP | 2008-115618 | A | 5/2008 |

OTHER PUBLICATIONS

International Search Report dated Jul. 7, 2009 of Corresponding PCT/JP2009/002698, filed Jun. 15, 2009.

Takafumi Sugiyama et al.; "Experimental Investigation on Alteration of the Characteristics of Bentonite Sand Mixtures at the Interface with Concrete by Electrical Migration Method", J. Soc. Mat. Sci. Japan, vol. 54, No. 8, pp. 816-821, Aug. 2005, with English Abstract or Excerpt.

Naomi Tomizawa et al.; "Experimental Studies on the Reduction of Expansion Force of Bentonite Sand Mixtures due to Calcium Leaching from Concrete", Japan Cement Association, Papers on cement/concrete, No. 60, 2006, pp. 162-168, with English Abstract or Excerpt.

Masaki Watanabe et al.; "Influence of Initial Dry Density on Conversion of Bentonite in Contact with Concrete to Calcium Type in Electrically Accelerated Test", Summaries in the 62th Annual Conference of the Japan Society of Civil Engineers, Sep. 2007, pp. 209-210, with English Abstract or Excerpt.

Isao Kurashige et al.; "Influence (4) of Underground Water Components on Leaching-out of Hardened Cement Substance—Mechanism of Phenomenon of Leaching-out Suppression with Bicarbonate Ions", Summaries in the 61th Annual Conference of the Japan Society of Civil Engineers, Sep. 2006, pp. 289-290, with English Abstract or Excerpt.

Natural Resources and Energy Research Committee, Nuclear Safety/Security Committee and Waste Safety Subcommittee; "Safety Rules for Low-level Radioactive Waste Subsurface Disposal (offered)", Jan. 2005, 66 total pages, with English Abstract or Excerpt.

\* cited by examiner

ARTIFICIAL MULTI-BARRIER FOR A RADIOACTIVE WASTE TREATMENT FACILITY

TECHNICAL FIELD

This invention relates to an artificial multi-barrier to radionuclide leaks from radioactive waste in a radioactive waste disposal/keeping structure mainly intended for low-level radioactive waste subsurface-disposal treatment facilities.

BACKGROUND ARTS

For the geological disposal of radioactive waste, there is provided an artificial barrier to prevent radionuclides from leaking out toward humans' living environment. Examination has been made on the use of an artificial multi-barrier wherein a low radionuclide-diffusion layer consisting of cement-based material functionally expectable to suppress nuclide diffusion and a low water-permeability layer having as its main component sodium-type bentonite expectable to provide swelling and cutoff are used in combination as shown in FIG. 1, as artificial barrier constituents in subsurface-disposal treatment facilities.

To evaluate the long-term stability of artificial barriers of this type, it becomes necessary to comprehend the change in quality of each artificial barrier constituent as well as the interaction between the barrier constituents. Especially, the leaching-out of calcium ions from the cement-based material causes not only the change in quality such as the conversion of sodium-type bentonite to the calcium type but also the resultant reduced performances at the same time as the decline in quality of cement-based material itself, and therefore, its earnest studies are in progress (Refer to Non-patent documents such as 1 to 3 and 5 mentioned infra, for instance).

The use of concrete permitting less formation of causal calcium hydroxide of such leaching-out from the cement-based material is considered as one measure against the above leaching-out. Heretofore, it has been definitely shown that the use of fly ash as a substitute for part of cement makes it possible to suppress the leaching-out.

Various studies have been also made on the influence of the action of solutions having bicarbonate ions and/or the phenomenon of the conversion of cement-based material to the densified form due to its neutralization on the physical properties of the cement-based material. Non-patent document 4 describes that bicarbonate ions occurring in the underground water are made to react with calcium hydroxide (calcium ions) leaching out from concrete so that a calcite (calcium carbonate) membrane is formed on a concrete surface, and consequently, the suppression of the subsequent leaching-out is attainable with this membrane.

As regards the change in quality of bentonite, Patent document 1 describes a bentonite quality change-proof agent containing metallic salts subjected to change into hydroxide under the alkali environment, in connection with an agent for use in waste disposal fields and/or low-level radioactive waste treatment facilities to prevent the change in quality of bentonite and a bentonite water-impermeability structure involving the use of this agent.

Patent document 2 describes that when using bentonite slurry for concrete joint cutoff and/or construction of a water impermeability layer in radioactive waste geological disposal fields or the like, bentonite slurry given in a slurried form with an aqueous solution of sodium bicarbonate, sodium carbonate or the like is adapted to prevent the change in quality and ensure the fluidity of bentonite slurry with the smaller amount of water as compared with the absence of these elements, and consequently makes it possible to maintain the bentonite swelling and cutoff.

Patent document 3 describes that as regards a cement composition used for grout material or the like having as its main component cement-based material with 0.1 to 0.5% by weight of bentonite, it is possible to maintain the bentonite swelling by adding sodium carbonate or the like.

Patent document 4 describes a waste treatment facility ground-creation process comprising forming a cutoff layer around waste without the need for any large-scaled apparatus, wherein bentonite-based material consisting of interlayer cations of bentonite and interlayer-cation water carrying the same type of interlayer cations is sprayed through nozzles to provide the cutoff layer. In this document, aqueous solutions of sodium carbonate, potassium carbonate, iron carbonate, sodium bicarbonate and potassium bicarbonate or the like are given as available examples of the interlayer-cation water.

The invention described in this Patent document 4 is to provide the execution of works by means of spraying with the small amount of water and maintain the bentonite swelling and cutoff by adding an aqueous solution of carbonate or bicarbonate to the bentonite-based material, like the invention described in Patent document 2.

REFERENCE DOCUMENTS ON PRIOR ARTS

Patent Documents

Patent document 1: Japanese Laid-open Patent Publication No. 2000-063114
Patent document 2: Japanese Laid-open Patent Publication No. 2006-083354
Patent document 3: Japanese Laid-open Patent Publication No. 2006-248887
Patent document 4: Japanese Laid-open Patent Publication No. 2007-050381

Non-Patent Documents

Non-patent document 1: "Basic research on change in quality of bentonite/sand mixture in contact with concrete according to electrophoresis" by Takafumi SUGIYAMA, Hiroaki FUKUOKA and Yukikazu TSUJI, J. Soc. Mat. Sci., Japan. Vol. 54, No. 8, August 2005, pages 816 to 821

Non-patent document 2: "Experimental research on reduction in swelling of bentonite/sand mixture due to calcium ions leaching out from concrete" by Naomi TOMIZAWA, Takafumi SUGIYAMA and Yukikazu TSUJI, Japan cement Association, Papers on cement/concrete, No. 60, 2006, pages 162 to 168

Non-patent document 3: "Influence of initial dry density on conversion of bentonite in contact with concrete to calcium type in electrically accelerated test" by Masaki WATANABE, Kenichiro NAKARAI, Takafumi SUGIYAMA, Yukikazu TSUJI and Naomi TOMIZAWA, Summaries in the 62th Annual Conference of the Japan Society of Civil Engineers, September 2007, pages 209 to 210

Non-patent document 4; "Influence (4) of underground water components on leaching-out of hardened cement substance—Mechanism of phenomenon of leaching-out suppression with bicarbonate ions" by Isao KURASHIGE, Michihiko HIRONAGA, Akira SEKIGUCHI and Kazuhito NIWASE, Summaries in the 61th Annual Conference of the Japan Society of Civil Engineers, September 2006, pages 289 to 290

Patent document 5: "Safety rules for low-level radioactive waste subsurface disposal (offered)" Natural resources and energy research committee, Nuclear safety/security committee and Waste safety subcommittee, December 2007

SUMMARY OF THE INVENTION

Problems to be Solved by the Invention

Non-patent document 4 suggests that there may well be that bicarbonate ions occurring in the underground water will aid in suppressing the leaching-out from the cement-based material, with respect to such problem of the leaching-out of calcium hydroxide (calcium ions) from the cement-based material as being in danger of occurrence with consideration of long time as much as several thousand or several ten thousand years, in the artificial multi-barrier wherein a low radionuclide-diffusion layer consisting of cement-based material and a low water-permeability layer having as its main component sodium-type bentonite are jointly used in contact with each other. However, the use of bicarbonate ions occurring in the underground water is unreliable and is hence considered to be unrealistic, in the artificial multi-barrier actually supposed to have the low water-permeability layer consisting of the bentonite-based material in contact with the outside of the low diffusion layer consisting of the cement-based material.

Patent documents 2 and 4 describe that the sodium bicarbonate or sodium carbonate provides the fluidity while holding down the amount of water mixed in the bentonite-based material, and consequently makes it possible to suppress the bentonite swelling and cutoff, with the secured executability of works. However, these documents do not take into account problems with the artificial multi-barrier, such as the problem of the decline in quality of the cement-based material due to the leaching-out of calcium hydroxide (calcium ions) from the cement-based material of the low diffusion layer and the problem of the reduction in swelling and cutoff due to the conversion of sodium-type bentonite to the calcium type caused by the resultant calcium ions.

The present invention is to overcome concurrently the problem of the decline in quality of a low diffusion layer due to the leaching-out of calcium hydroxide (calcium ions) from cement-based material and the problem of not only the change in quality of a low water-permeability layer due to the conversion of sodium-type bentonite to the calcium type but also the resultant reduced performances, in an artificial multi-barrier wherein the low diffusion layer consisting of the cement-based material is arranged on the outside of a concrete pit housing radioactive waste, and the low water-permeability layer having as its main component the sodium-type bentonite is arranged in contact with the outside of the low diffusion layer, wherein a back-filling layer containing cement is arranged in contact with the outside of the low water-permeability layer.

Means for Solving the Problems

The invention according to Claim 1 of the present application relates to an artificial multi-barrier for a radioactive waste treatment facility wherein a low diffusion layer consisting of cement-based material is arranged on the outside of a concrete pit housing radioactive waste, and a low water-permeability layer having as its main component sodium-type bentonite is arranged in contact with the outside of the low diffusion layer, the artificial multi-barrier being characterized by providing mixing sodium bicarbonate or sodium carbonate with the constituents of the low water-permeability layer so that in case of the leaching-out of calcium ions from the cement-based material of the low diffusion layer, the above calcium ions are made to react with the sodium bicarbonate or sodium carbonate mixed with the constituents of the low water-permeability layer so that a calcium ion-diffusion barrier layer having calcium carbonate as its main component is formed in the vicinity of the interface between the low diffusion layer and the low water-permeability layer.

By providing preliminarily mixing the sodium bicarbonate or sodium carbonate with the constituents of the low water-permeability layer having as its main component the sodium-type bentonite supposed to be in contact with the cement-based material of the low diffusion layer, there may give occasion to coexistence of bicarbonate ions ($HCO_3^-$) or carbonate ions ($CO_3^{2-}$) and sodium ions ($Na^+$) in the low water-permeability layer if there is some moisture therein, so that if the calcium ions ($Ca^+$) leach out from the cement-based material of the low diffusion layer toward the low water-permeability layer, the reaction of the calcium ions with the above anions causes hardly-soluble calcite ($CaCO_3$) to be formed in the vicinity of the interface between the low diffusion layer and the low water-permeability layer, whereby it may be expected that the effects such as of not only suppressing the subsequent leaching-out from the cement-based material of the low diffusion layer but also achieving the suppression of the conversion to the calcium type by the presence of sodium ions in the vicinity of the sodium-type bentonite would be obtained.

The above moisture indicates seepage water such as underground water and rainwater for the middle to long run, and is mixing water contained in the low diffusion layer for the short run. The presence of the moisture attributed to this mixing water enables the early formation of the above calcite ($CaCO_3$). This calcite has densified layers, and therefore, the migration of calcium ions hardly takes place in a calcite portion.

The invention described in Claim 2 is characterized in that in the artificial multi-barrier for the radioactive waste treatment facility according to Claim 1, a back-filling layer (a refilling layer) consisting of material containing cement is arranged in contact with the outside of the low water-permeability layer so that in case of the leaching-out of calcium ions from the back-filling layer, the above calcium ions are made to react with the sodium bicarbonate or sodium carbonate mixed with the constituents of the low water-permeability layer so that a barrier layer having calcium carbonate as its main component is formed also in the vicinity of the interface between the low water-permeability layer and the back-filling layer.

As regards a contact area where the back-filling layer material containing the cement is in contact with the sodium-type bentonite of the low water-permeability layer, there may exist the problem of the decline in quality of the back-filling layer resulting from the reduced swelling or the like of the sodium-type bentonite due to the leaching-out of the calcium hydroxide (calcium ions) from the material containing the cement and the problem of the reduction in cutoff of the low water-permeability layer due to the conversion of the bentonite to the calcium type. However, by providing preliminarily mixing the sodium bicarbonate or sodium carbonate with the constituents of the low water-permeability layer having as its main component the sodium-type bentonite, there is provided the calcium ion-diffusion barrier layer having the calcium carbonate as its main component in the vicinity of the interface even in a boundary between the low water-permeability layer and the back-filling layer, resulting in elimination of the problem of the degradation of the back-filling layer due to the leaching-out from the material containing the cement and the problem of not only the change in quality of the sodium-type bentonite in the low water-permeability layer due to the diffusion of the resultant calcium ions into the low water-permeability layer but also the resultant reduced performances.

The invention described in Claim 3 imposes limitation on that in the artificial multi-barrier for the radioactive waste treatment facility according to Claim 1 or 2, the low water-permeability layer is in the form of a compacted layer of a sodium-type bentonite/sand mixture containing sodium bicarbonate or sodium carbonate.

The sand in this case is used to ensure the strength of the low water-permeability layer and for density adjustment or the like and is desirably subjected to compaction into a dense state (1.6 g/cm$^3$ or above in dry density) as much as possible in order to make sure of the strength and the water-tightness. There is no particular limitation to a method and an apparatus for compaction. Thus, the use of rollers, rammers, vibrating compaction machines or those usually employed in compaction of the soil or the like is possible, for instance.

Although no particular limitation to the sand, the use of sand having the grain diameter maximally limited to about 1.5 mm or less, preferably 1.2 mm or less, is required to densify the low water-permeability layer for attainment of higher performance as of the low water-permeability layer, while ensuring the fluidity during the execution of works.

The invention described in Claim 4 is characterized in that in the artificial multi-barrier for the radioactive waste treatment facility according to Claim 1 or 2 or 3, the low water-permeability layer has the sodium bicarbonate or sodium carbonate, at least part of which being mixed in the form of powder so as to have the concentration supersaturating the mixing water in the vicinity of the interface between the low water-permeability layer and the other layer at least containing the cement or consisting of the cement-based material.

Judging from the experimental results described later, to maximally give the effects of the above present invention, it is desirable to mix the sodium bicarbonate or sodium carbonate so as to have the concentration supersaturating the mixing water. However, the solubility varies depending on the temperature and/or the type of salts. For instance, the sodium bicarbonate has a solubility of 8.13 g to 100 g of water at 10° C. and that of 10.28 g to 100 g of water at 25° C., and the sodium carbonate has a solubility of about 22 g to 100 g of water at 20° C.

For the supersaturation concentration of the sodium bicarbonate or sodium carbonate, it is necessary to mix at least part of it in the solid form, normally powder. It is noted that for the concentration part not more than saturation concentration, it is also allowable to give the sodium bicarbonate or sodium carbonate in the form of a saturated solution by dissolving it in the mixing water added to the bentonite or the like.

It is also noted that solubility varies depending on the temperature as described the above, and therefore, it is necessary to determine the mixing amount of sodium bicarbonate or sodium carbonate in consideration of the influence of the temperature in order to hold the supersaturation concentration as much as possible.

The invention described in Claim 5 imposes limitation on that in the artificial multi-barrier for the radioactive waste treatment facility according to Claim 1, 2, 3 or 4, the radioactive waste includes low-level radioactive waste.

One specific application of the present invention may involve the effective use in the artificial multi-barrier arranged on the outside of the concrete pit housing the radioactive waste in the low-level radioactive waste subsurface-disposal treatment facilities now under contemplation.

It is noted that examples of the low-level radioactive waste intended for the disposal include those resulting from concentrating and solidification of radioactive-waste water produced from nuclear power plants and those such as filters and filtration apparatuses used for purging, inclusive of used floor-cloths and working cloths, which have been packed in 200 L-drums after subjection to compression and incineration into a mass hardened with cement and/or asphalt.

Effects Of The Invention

According to the present invention, in the above artificial multi-barrier in a specific arrangement for the radioactive waste treatment facility, the calcium ions resulting from the leaching-out from the cement-based material making up of the low diffusion layer are made to react with the bicarbonate ions or carbonate ions originating from the sodium bicarbonate or sodium carbonate mixed with the constituents of the low water-permeability layer having as its main component the sodium-type bentonite making up of the low water-permeability layer so that the calcium ion-diffusion barrier layer having the calcium carbonate as its main component is formed in the vicinity of the interface between the low diffusion layer and the low water-permeability layer, thereby allowing the decline in quality of the low diffusion layer due to the leaching-out of calcium hydroxide (calcium ions) from the cement-based material of the low diffusion layer to be suppressed.

As regards the low water-permeability layer side, it has been feared that the calcium ions leaching out from the cement-based material of the low diffusion layer bring about the conversion of the sodium-type bentonite to the calcium type, leading to the resultant reduced performances such as the reduction in swelling. However, according to the present invention, the barrier layer having as its main component the hardly-soluble calcium carbonate is formed in the vicinity of the interface between the low diffusion layer and the low water-permeability layer as described the above, so that the calcium ions resulting from the subsequent leaching-out from the low diffusion layer are prevented from entering the low water-permeability layer, resulting in elimination of the problem of not only the change in quality of the sodium-type bentonite but also the resultant reduced performances.

For the low water-permeability layer side, it may be also expected that the effect of achieving the suppression of the conversion to the calcium type by the presence of sodium ions in the vicinity of the sodium-type bentonite would be obtained.

BEST MODE FOR CARRYING OUT THE INVENTION

Figure 1:
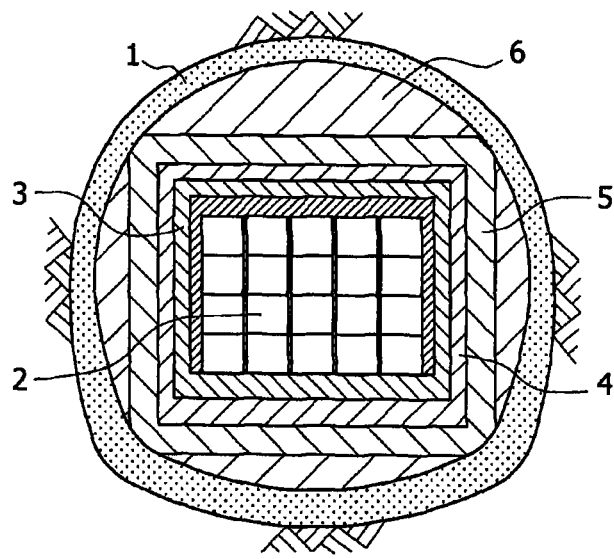
FIG. 1 is a sectional view showing a basic structure of a low-level radioactive waste subsurface-disposal treatment facility.

An application to an artificial multi-barrier in a low-level radioactive waste subsurface (at the depth of about 50 to 100 m from the ground surface)-disposal treatment facility now under examination for practical use as shown in FIG. 1 is considered as one embodiment.

The execution for the low-level radioactive waste subsurface-disposal treatment facility is schemed that a concrete pit 3 housing radioactive waste 2 is established in a tunnel 1 having been constructed under the ground, a low diffusion layer 4 consisting of cement-based material is arranged on the outside of the concrete pit, and a low water-permeability layer 5 having bentonite-based material is arranged on the outside of the low diffusion layer 4.

It is also schemed that a back-filling layer 6 having material containing cement is formed on the outside of the low water-permeability layer 5 by means of back-filling to fill up a space between the tunnel 1 and the low water-permeability layer.

It will be appreciated that an artificial multi-barrier according to the present invention has a structure that follows the above-schemed artificial multi-barrier as shown in FIG. 1.

(1) Concrete Pit

The concrete pit 3 is in the form of a hermetically sealed-up room made of normal concrete and may be equipped with radionuclide shielding means.

(2) Low-Diffusion Layer

The low-diffusion layer 4 consisting of the cement-based material of the present invention is arranged in contact with the concrete pit 3. The low-diffusion layer 4 is functionally to suppress the diffusion of radionuclides in the artificial multi-barrier of the present invention and therefore gives importance to the suppression of cracks as well as the suppression of cement leaching-out.

The cement-based material stated in the present invention indicates those capable of forming concrete, mortar and other cement-hardened substances. Although no limitation to the type of cement, it is desirable to use high-strength cement, acid-resistant cement, blended cement or the like.

It is noted that the low-diffusion layer 4 requires that the diffusion of radionuclides be limited to $1.0 \times 10^{-12}$ $m^2/s$ or below. Thus, the scheme of execution supposing the use of the above cement-based material as one artificial barrier constituent expectable to provide such diffusion-suppression performance at relatively low cost and secure the structural stability to earth pressure is now being carried forwards (Refer to Non-patent document 5, for instance).

(3) Low Water-Permeability Layer

The low water-permeability layer 5 has sodium-type bentonite as its main component and is arranged in contact with the outside of the low-diffusion layer 4. The low water-permeability layer 5 is to suppress the quantity of underground water that runs through the treatment facility.

The low water-permeability layer 5 requires that permeability be limited to $1.0 \times 10^{-12}$ m/s or below. Thus, the scheme of execution supposing the use of the bentonite-based material as one artificial barrier constituent expectable to provide such permeability-suppression performance at relatively low cost is being carried forwards (Refer to Non-patent document 5, for instance).

As regards the low water-permeability layer 5, the present invention preferably employs a mixture of sodium-type bentonite and sand having a relatively small grain diameter of, for instance, maximally 1.5 mm or less, preferably 1.2 mm or less, and sodium bicarbonate or sodium carbonate is further mixed with these constituents.

About 10 to 70% by weight of sand to the weight of bentonite is added, to which is added mixing water on the work site to provide a mixture using a mixer, a backhoe or the like, and the mixture is then subjected to compaction. Although no particular limitation to the type of sand, it is desirable to use barite, called jyushoseki in Japanese, because of its properties, inclusive of shielding effect.

Compaction may be given by using a compaction machine, a rolling-compaction roller or the like so as to obtain a dry density of 1.6 $g/cm^3$ or above.

The amount of mixing water is also determined in accordance with the above dry density. If there is too low dry density, for instance, it is allowable to reduce the amount of mixing water.

The sodium bicarbonate or sodium carbonate desirably requires that it should be in a concentration close to the saturation concentration or in a supersaturation concentration preferably within the low water-permeability layer 5. As described the above, the solubility varies depending on whether mixed is the sodium bicarbonate or sodium carbonate and also with temperature (in the range of temperatures up to room temperature, the solubility increases with increasing temperature). Therefore, the mixing amount of sodium bicarbonate or sodium carbonate may be determined so as to obtain the concentration close to the saturation concentration in the mixing water or the concentration supersaturating the mixing water, in accordance with the upper-limit temperature within the range of supposed temperatures in the situation of the tunnel 1.

It is noted that adding more sodium bicarbonate or sodium carbonate than necessary is assumed to be of no use and also liable to affect the performances of the low water-permeability layer 5. Thus, it may be considered that the mixing amount of sodium bicarbonate or sodium carbonate should be limited up to about a 10 to 20 percent increase to the solubility at the upper-limit temperature within the range of supposed temperatures in the neighborhood of the tunnel 1, for instance. For the concentration supersaturating the mixing water, at least part of the sodium bicarbonate or sodium carbonate is added in the solid form such as powder, for instance.

The moisture in the low water-permeability layer 5 is attributed to the mixing water at the initial stage, and afterwards, there may be some cases where an increase in moisture affected by the underground water or seepage water occurs depending on the environments. In such cases, the above barrier layer will be easily formed, so that by providing mixing the sodium bicarbonate or sodium carbonate at least at not less than the concentration supersaturating the mixing water, it becomes possible to achieve the early formation of the barrier layer with this mixing water, and also reduce the adverse influence even to the effect of external water.

Further, the sodium bicarbonate or sodium carbonate does not always need to be uniformly mixed in the whole of the low water-permeability layer 5 and thus desirably requires that a high concentration or supersaturation concentration be obtained in the vicinity of the interface between the low water-permeability layer and the low diffusion layer consisting of the cement-based material or the back-filling layer 6. This is because the influence of the above leaching-out on the low water-permeability layer 5 is largely dependent on the leaching-out occurring in the vicinity of the interface, and the formation of the barrier layer takes place in the vicinity of the interface as well.

One specific execution process in such a case may be by providing the low water-permeability layer 5 having more than one layer in the thickness direction, wherein only the layer in contact with the low diffusion layer 4 or the back-filling layer 6 is conditioned to have the sodium bicarbonate or sodium carbonate of the supersaturation concentration, while the inner layer or layers are conditioned to have no sodium bicarbonate or sodium carbonate or otherwise have it of a lower concentration.

(4) Back-Filling Layer

The back-filling layer 6 is arranged in contact with the outside of the low water-permeability layer 5 and consists of refilling material having excavated earth and sand as its main component. It is desirable to permit hardening material such as cement to be held in the refilling material for the attainment of greater durability and/or in forming the barrier layer.

Especially, it is desirable to permit a barrier layer consisting of calcium carbonate to be formed in the vicinity of the interface between the low water-permeability layer 5 and the back-filling layer 6, like the above vicinity of the interface between the low diffusion layer 4 and the low water-permeability layer 5.

It is also desirable to permit fillers consisting of various types of fine powders to be held in the refilling material so as to provide a densified texture for the back-filling layer 6. Available examples of the fillers include crushed stone sludge, fine powders of reproduced aggregate by-products, coal ash, paper sludge ash, silica fumes or like silica-based or silica alumina-based inorganic fine powders.

It is known that the fillers of these types form C—S—H gels, C-A-H crystals and A-H gels or the like in the early stage of cement hydration and lead to a pozzolan reaction to provide the densified texture for the middle to long run.

If there is provided the low diffusion layer 4 in which the fillers of these types are held, it is also allowable to make the low diffusion layer 4 densified likewise, thereby allowing the leaching-out of calcium ions from the cement-based material to be suppressed.

(5) Constructing Process of Artificial Multi-Barrier of the Present Invention

As regards the low-level radioactive waste subsurface (at the depth of about 50 to 100 m from the ground surface)-disposal treatment facility where the artificial multi-barrier is constructed, there exists confirmation that a test cavern of about 18 m in diameter can be constructed without any hindrance, as described in Non-patent document 5.

One specific procedure of construction is hereinafter described with reference to FIG. 1. In FIG. 1, there is shown a section perpendicular to the axial direction of the tunnel. As described the above, the concrete pit 3 housing the radioactive waste 2 is established in the center of the section of the tunnel 1, and the low diffusion layer 4, the low water-permeability layer 5 and the back-filling layer 6 are arranged on the outside of the concrete pit, resulting in a series of such sections in the axial direction of the tunnel 1.

Construction works after the construction of the tunnel 1 are started on the bottom of the tunnel so that the back-filling layer 6 consisting of the material containing the cement, the low water-permeability layer 5 consisting of the bentonite-based material and the low diffusion layer 4 consisting of the cement-based material such as mortar are built up in sequence in the range from the bottom of the tunnel 1 in a designed section to the height of the bottom surface of the concrete pit 3, while being subjected to rolling compaction.

Subsequently, a base plate and a side wall of the concrete pit 3 are built into completion of a channel-shaped pit with its upper surface open, with respect to an area where the execution of works up to the height of the bottom surface of the concrete pit 3 is finished. It is noted that as regards the concrete pit 3, it is possible to secure the structural stability by arranging diaphragms at predetermined intervals in the axial direction of the tunnel. It is also advantageous for the aspect of supervision of works by dividing the concrete pit into a large number of rooms to house containers of the radioactive waste 2.

While cast-in-place with reinforcing bars framed on the site is also applicable to construct the concrete pit 3, greater executability of works is provided by setting up precast concrete segments or blocks on the site, when used.

On completion of the channel-shaped pit with its upper surface open, containers each holding the radioactive waste 2 are carried in the tunnel 1, followed by being piled up in an orderly manner on the bottom of the concrete pit 3 using a temporary overhead travelling crane or the like. Inter-container spaces are filled up with cement-based fillers such as mortar for the sake of stability.

After housing of the containers each holding the radioactive waste 2 is finished with respect to one or more areas, a top plate is mounted on the concrete pit 3 with respect to the area where the housing is finished. It is desirable to use precast concrete segments or blocks for the top plate as well.

Subsequently, framing of forms is carried out in sequence in accordance with the designed section to construct around the concrete pit 3 the low diffusion layer 4 consisting of the cement-based material such as mortar and the low water-permeability layer 5 consisting of the bentonite-based material, and finally, the material containing the cement is filled in the space between the low water-permeability layer 5 and the inner surface of the tunnel 1 to provide the back-filling layer 6. A usual construction process may be applied, as it is, to the execution of works itself of these constituents.

Repetition of the above works in sequence from the inner side to this side of the tunnel 1 allows the construction of the low-level radioactive waste treatment facility having the artificial multi-barrier extending continuously in the axial direction of the tunnel 1 to be attained.

Now described are experiments that were made using electrophoresis to verify the effects of the present invention. The reason for the use of electrophoresis is that for the practically constructed artificial multi-barrier, it has been predicted that the leaching-out of calcium ions from the cement-based material of the low diffusion layer 4 would take longtime in units of several thousand or several ten thousand years to become an issue. This is also because the validity of electrophoresis is shown in Non-patent documents 1 to 3 referred to in the above paragraph of BACKGROUND ARTS.

A. Experiment 1: Mixing of Sodium Bicarbonate

A-1 Outline of Experiment

A composite specimen having the low diffusion layer (cement paste) and the low water-permeability layer (bentonite/sand mixture) in contact with each other was used for an experiment (Experiment 1) to make sure of the change in quality of bentonite in the low water-permeability layer as well as the swelling thereof.

A-1-1 Preparation for Composite Specimen (1) Preparation for Bentonite/Sand Mixture Used were KUNIGEL-V1 (sodium-type bentonite) as bentonite, 2.62 g/cm³-density land sand with its maximum grain diameter adjusted to 1.2 mm as sand and distilled water as water (mixing water), respectively. The mass ratio of $NaHCO_3$ to bentonite was used to denote a $NaHCO_3$ mixing rate, which was set at four levels of 0, 0.4, 4.1 and 7.1% (pertinent to four types of specimens named C0, C0.4, C4 and C7). For C0, C0.4 and C4, $NaHCO_3$ was dissolved after the adjustment of the amount of mixing water so that the mixing water has the concentrations of 0, 10 and 103 g/l (the saturation concentration at 25° C.) respectively according to the mixing rates. For C7, $NaHCO_3$ in the form of powder was merely mixed with bentonite and sand.

The pour water (the mixing water) concentration for C7 after mixed results in supersaturation. Table 1 lists the $NaHCO_3$ mixing rates and the $NaHCO_3$ concentrations. The bentonite and the sand were mixed in the mass ratio of 7:3, and an omni-mixer was used for mixing. Afterwards, the predetermined amount of $NaHCO_3$ solution or distilled water (the mixing water) was sprayed. After mixing, into a polyethylene bag was put a mixture sample, which was then allowed to stand overnight and was mixed again using the omni-mixer at the next day, followed by being subjected to compaction.

TABLE 1

| Specimen named | NaHCO₃ mixing rate (%) | NaHCO₃ concentration (g/l) |
|---|---|---|
| C0 | 0 | 0 |
| C0.4 | 0.4 | 10 |
| C4 | 4.1 | 103 (saturation) |
| C7 | 7.1 | 103 (supersaturation) |

(2) Preparation for Composite Specimen

In preparation for the composite specimen, the bentonite/sand mixture was tamped down so as to be as thin as 65 mm in four layers on the upper surface of a 100 mm-diameter and 25 mm-thick cylindrical cement paste specimen placed on an electrophoresis testing cell made of acrylic material. A stainless steel electrode was then mounted thereon, and the bentonite/sand mixture was further subjected to compaction so as to reduce its thickness to 10 mm.

Compaction was by dropping a 2.5 Kg-mass rammer from a height of 300 mm. For easy evaluation on the change in quality of the bentonite, the bentonite/sand mixture was set at a relatively low dry density of 1.6 g/cm³.

The cement paste having W/C (mixing water-to-cement mass ratio) of 60% was provided, and normal Portland cement was used for the cement. Like the bentonite-sand mixture, setting at a high W/C was taken for early appearance of the change in quality. Table 2 lists blending of the cement paste

TABLE 2

| | Quantity of material per unit volume of concrete (kg/m³) | | |
|---|---|---|---|
| W/C (%) | W (Water) | C (Cement) | Segregation-reducing agent |
| 60 | 655 | 1091 | 6.0 |

In this experiment, a segregation-reducing agent (under the trade name "ASUKA CLEAN D" by SHIN-ETSU CHEMICAL CO., LTD.) was used to prevent segregation. The specimen was placed in a 100 mm-diameter and 200 mm-high cylindrical form and was removed therefrom after membrane curing up to the age of one day. The specimen was then subjected to water curing for the period of time from the form removal till the age meeting the start of the electrophoresis test, followed by being cut into pieces of a predetermined size. It is noted that in consideration of the influence of segregation or the like, four pieces of specimens were made from the same cylindrical specimen after its upper and lower ends were cut off by 10 mm each. The cement paste specimens C0 and C0.4 at the time of testing are 50 days of age, and C4 and C7 being 97 days of age.

A-1-2 Electrophoresis Test

Figure 2:
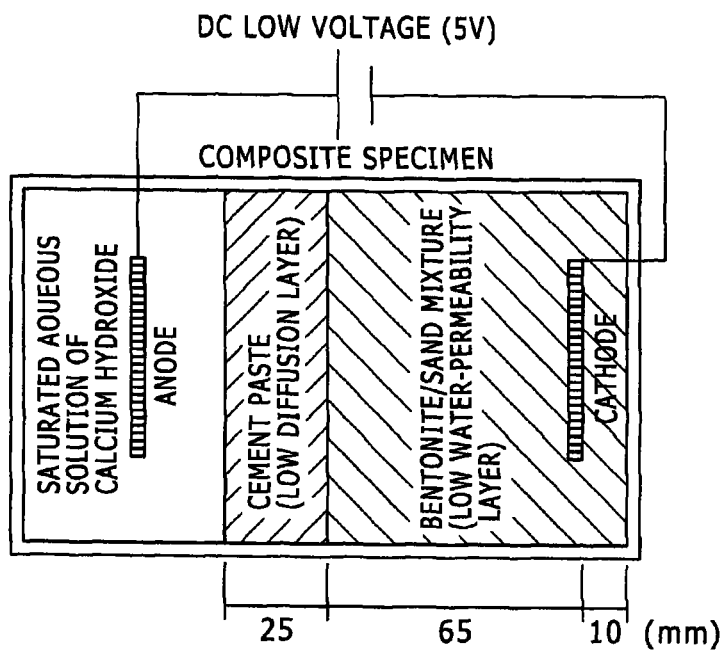
FIG. 2 is a schematic illustration of an electrophoresis testing apparatus for a composite specimen in an electrophoresis test.

In FIG. 2, there is shown the outline of a composite specimen electrophoresis testing apparatus.

An embedded cathode in the bentonite/sand mixture of the composite specimen and an anode in a saturated aqueous solution of calcium hydroxide are respectively in the form of a reticulated stainless-steel electrode of 4 mm-meshes. The anode was installed in the saturated aqueous solution of calcium hydroxide supposed to be in contact with the cement paste. Contact of the cement paste with the saturated aqueous solution of calcium hydroxide was aimed at not only preventing the cement paste from being dried but also permitting calcium ions to be supplied to the cement paste.

After the installation of the composite specimen, DC constant-voltage of 5V was applied to the electrophoresis cell with its gap filled with the saturated aqueous solution of calcium hydroxide, causing the electrophoresis of calcium ions from the cement paste into the bentonite/sand mixture. To evaluate the influence of $NaHCO_3$ mixing on electric current, the testing period was made uniform for all the composite specimens. The testing period was set at 140 hours in order to obtain an integrated quantity of electricity of about 13 kC considered to be expectable to make sure of the change in quality of the bentonite. The integrated quantity of electricity stated herein indicates a current value calculated by adding up, for the testing period, measured current values obtained during the testing period.

A-1-3 Analysis Method

Figure 3:
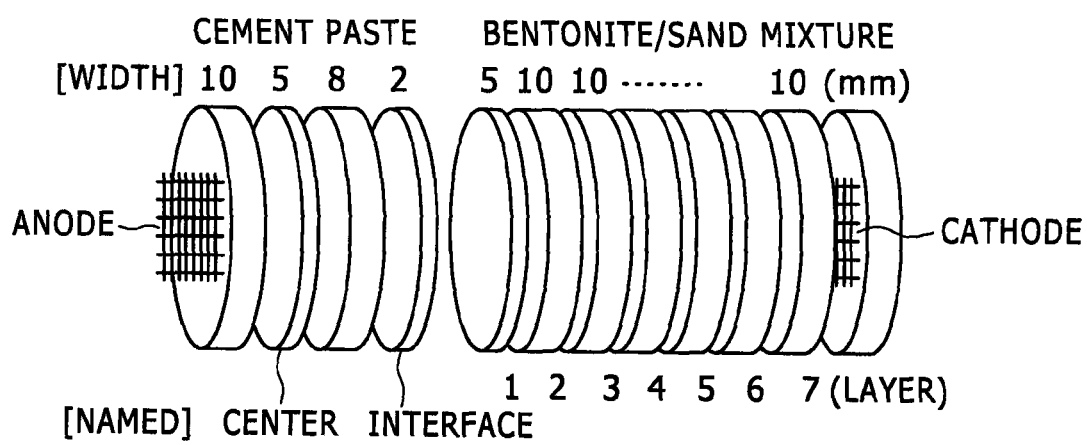
FIG. 3 is a view illustrating the cut state of the composite specimen having undergone the electrophoresis test.

The composite specimen having undergone the electrophoresis test was used for each analysis in a cut state as shown in FIG. 3.

As regards the cement paste, it was cut into pieces under such conditions that cement paste parts about 0 to 2 mm and 10 to 15 mm away from the bentonite interface side are respectively specified as being of the vicinity of the interface and of the center. Then, the cut pieces were respectively crushed into powder of 90 μm. After crushing, thermal analysis was made using thermogravimetry-differential thermal analysis (which will be hereinafter simply referred to as TG-DTA) for measurement on $Ca(OH)_2$ content and that on $CaCO_3$ content.

For a bentonite/sand mixture part in the range of the cement paste interface to the cathode electrode, the measurement on the swelling and that on the leaching amount of cations were respectively made in conformity with a JAPAN BENTONITE INDUSTRIAL STANDARD testing method.

On the assumption that the swelling is considered as an increase in apparent volume, into a 100-ml graduated cylinder was poured 100 ml of distilled water, to which was added in about ten installments 2.0 g of 150 μm-grain diameter powder of the bentonite/sand mixture sample in all. Then, after standing for 24 hours, the measurement on the swelling was carried out by reading the apparent volume of the sample deposited at the bottom of the cylinder. The unit of the swelling thus measured is expressed by (ml/2 g).

The measurement on the leaching amount of cations was carried out on calcium ions and sodium ions using an atomic absorption photometer.

Each analysis on the bentonite/sand mixture was carried out on a layer basis after a piece of layer about 5 mm (the vicinity of the interface) away from the cement paste interface was sliced from the 65 mm-thick bentonite/sand mixture, and the remaining part was sliced into pieces of about 10 mm-thick layers one at a time. It is noted that a cement paste interface-side layer is referred to as the first layer, and other layers being numbered upwards.

A-2 Experimental Results
A-2-1 Results of Electrophoresis Test

Figure 4:
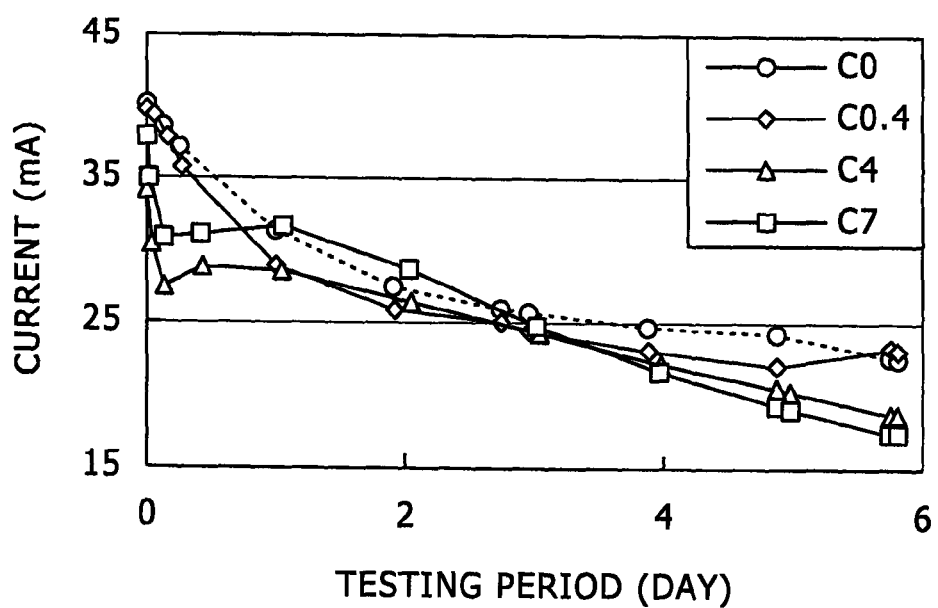
FIG. 4 is a graph showing a reduction in current with the passage of time in the course of the electrophoresis test.

The current in the course of the electrophoresis test was reduced with the passage of time as shown in FIG. 4. After 140 hours elapsed, the electrophoresis test was finished, and finally, the electrophoresis cell was disassembled. Table 3 lists the integrated quantities of electricity after tested.

TABLE 3

| Specimen named | Testing period (h) | Integrated quantity of electricity (kC) |
| --- | --- | --- |
| C0 | 140 | 13.7 |
| C0.4 | | 13.0 |
| C4 | | 12.3 |
| C7 | | 12.7 |

While it is considered that by mixing $NaHCO_3$, the total ion content in the bentonite is so increased as to obtain greater electric current, the results show that C0 was the greatest in the integrated quantity of electricity, whereas C4 was the least. It may be considered that the types of specimens with $NaHCO_3$ mixed have smaller integrated quantity of electricity than other types of specimens with no $NaHCO_3$, so that mixing of $NaHCO_3$ results in an increase in electric resistance of the composite specimen. Further, each of the current values of C4 and C7 at the time when the test is over shows more tendency toward reduction than the current value of C4 with no $NaHCO_3$ or C0.4 with $NaHCO_3$ mixed at a relatively low mixing rate. Accordingly, judging from the above, it may be expected that a longer testing period would be attributable to a greater difference in current values.

One reason for the occurrence of the increase in electric resistance is considered to be that $HCO_3^-$ having been migrated toward the anode within the bentonite was made to react with $Ca^{2+}$ having been migrated toward the cathode within the cement paste so that a $CaCO_3$ (calcite) membrane was formed on the interface. However, this will be the subject matter of later examinations in combination with the analysis results.

A-2-2 Results of Thermal Analysis

Table 4 lists the results of thermal analysis that was made using the TG-DTA on the cement paste specimens before (an initial value) and after electrophoresis-tested.

TABLE 4

| Specimen named | | $Ca(OH)_2$ content % | $CaCO_3$ content % | Total Ca content kmol/m³ | Percentage (%) |
| --- | --- | --- | --- | --- | --- |
| Initial value | | 24.72 | 2.92 | 3.33 | 100 |
| C0 | Center | 24.70 | 3.70 | 3.40 | — |
| | Interface | 8.98 | 7.93 | 1.84 | 55 |
| C0.4 | Center | 23.59 | 3.81 | 3.27 | — |
| | Interface | 13.73 | 7.36 | 2.38 | 71 |
| C4 | Center | 22.65 | 6.70 | 3.42 | — |
| | Interface | 9.13 | 22.60 | 3.20 | 96 |
| C7 | Center | 21.48 | 7.87 | 3.38 | — |
| | Interface | 9.85 | 22.59 | 3.29 | 99 |

In this experiment, the evaluation on the leaching-out from the cement paste was carried out by measuring the content of $Ca(OH)_2$ which is larger in quantity and has higher solubility among the cement hydrates. To take account of the carbonatation in the vicinity of the interface between the cement paste and the bentonite/sand mixture, the determination of $CaCO_3$ was also made in combination. The $Ca(OH)_2$ and $CaCO_3$ contents to the sample mass at 800° C. were found. It is noted that because of the use of cement on the market for the experiments in this study, there was given such correction on the basis of the results of separately carried-out thermal analysis of cement simples as being changed to values found in the cement paste free of the influence of ignition loss. It is also noted that a value calculated by adding up the physical quantity of Ca in $Ca(OH)_2$ and $CaCO_3$ per unit volume of the cement paste was used to denote the total Ca content.

While the thermal analysis in this study was carried out under the atmospheric environment, the existing studies indicate that the thermal analysis under the atmospheric environment involves the carbonatation of $Ca(OH)_3$ in the sample in the course of analysis. It is thus considered that the measurement environment affected this experiment, because there was observation of $CaCO_3$ even in the mixture sample supposed to be free of the influence of carbonatation before the start of the electrophoresis test. However, $CaCO_3$ thus observed is considered to be of a negligible value as far as the substance of examinations described later is concerned, because the observed value was smaller as compared with the $Ca(OH)_2$ content and besides, all the analyses were carried out under the same environment.

Primarily, the result is that the $Ca(OH)_2$ and $CaCO_3$ contents and the total Ca content in the center of all the specimens compared well with their initial values. This may be because there has been no influence of the leaching-out from the specimens thanks to the feed of $Ca(OH)_2$ from the saturated aqueous solution of calcium hydroxide in contact with the cement paste.

Secondarily, obtained is the result that the $Ca(OH)_2$ content in the interface made no great difference, except for C0.4 at which there was a small increase. Meanwhile, as regards the $CaCO_3$ content, an increase of $CaCO_3$ content by about three times was observed in the vicinity of the interface for C4 and C7, as compared with other two specimens, while being some affected by the analysis environment.

This result suggests that there occurred the electrophoresis of $HCO_3^-$ existing in the bentonite/sand mixture toward the cement paste so that $CaCO_3$ (calcite) was formed in the vicinity of the interface. As regards the total Ca content, it is seen that C0, C0.4, C4 and C7 are 55, 71, 96 and 99% in the ratio of the total Ca content in the interface to its initial value, respectively, resulting in almost no change for C4 and C7. Judging from the above, it may be considered that mixing of NaHCO$_3$ at the concentration exceeding the saturation concentration is highly expectable to have the effect of suppressing the leaching-out.

A-2-3 Quantitative Evaluations Based on Swelling and Leaching Amount of Cations (1) Leaching Amount of Cations Table 5 lists the results of the measurement on the leaching amount of cations for each layer of the bentonite/sand mixture after electrophoresis-tested. The leaching amount of cations resulting from the measurement that was made before the electrophoresis test of each specimen is here shown as an initial value. It is seen from the initial values for all the specimens that each specimen is of sodium type because of its higher sodium ion content than the calcium ion content.

TABLE 5

| | | Leaching amount of cations meq/100 g | | | | | | | |
|---|---|---|---|---|---|---|---|---|---|
| | | | After electrophoresis test Bentonite/sand mixture | | | | | | |
| Specimen named | Ion | Initial value | 1$^{st}$ layer | 2$^{nd}$ layer | 3$^{rd}$ layer | 4$^{th}$ layer | 5$^{th}$ layer | 6$^{th}$ layer | 7$^{th}$ layer |
| C0 | Ca | 40.5 | 92.3 | 73.3 | 69.9 | 43.8 | 41.0 | 53.0 | 73.0 |
| | Na | 59.3 | 18.6 | 21.5 | 28.4 | 55.5 | 72.0 | 84.3 | 97.8 |
| C0.4 | Ca | 41.0 | 77.5 | 82.9 | 40.1 | 34.3 | 27.4 | 26.9 | 25.4 |
| | Na | 66.0 | 16.7 | 24.9 | 61.1 | 71.9 | 83.9 | 82.5 | 99.4 |
| C4 | Ca | 42.9 | 92.8 | 55.1 | 37.6 | 35.1 | 40.3 | 39.8 | 38.9 |
| | Na | 93.4 | 22.2 | 56.2 | 98.1 | 80.4 | 95.6 | 95.7 | 116.4 |
| C7 | Ca | 44.2 | 112.8 | 48.9 | 46.4 | 48.3 | 48.0 | 46.8 | 43.6 |
| | Na | 113.4 | 38.8 | 91.2 | 107.3 | 108.3 | 107.4 | 121.0 | 135.1 |

As regards the calcium ions, it is seen that the calcium ion content is maximized in the first layer specified as a cement paste-side (in the vicinity of the interface) layer for all the specimens, while being greater in the first to third layers for C0 and in the first and second layers for C4. This may be because there occurred the migration of the calcium ions into the bentonite/sand mixture after having leached out from the cement paste. Meanwhile, as regards the sodium ions, it is seen that for all the specimens, there is shown a greater value with increasing distance from the cement paste side to the cathode side (the side opposite to the cement paste). This may be because there occurred the electrophoresis of the sodium ions toward the cathode.

Figure 5:
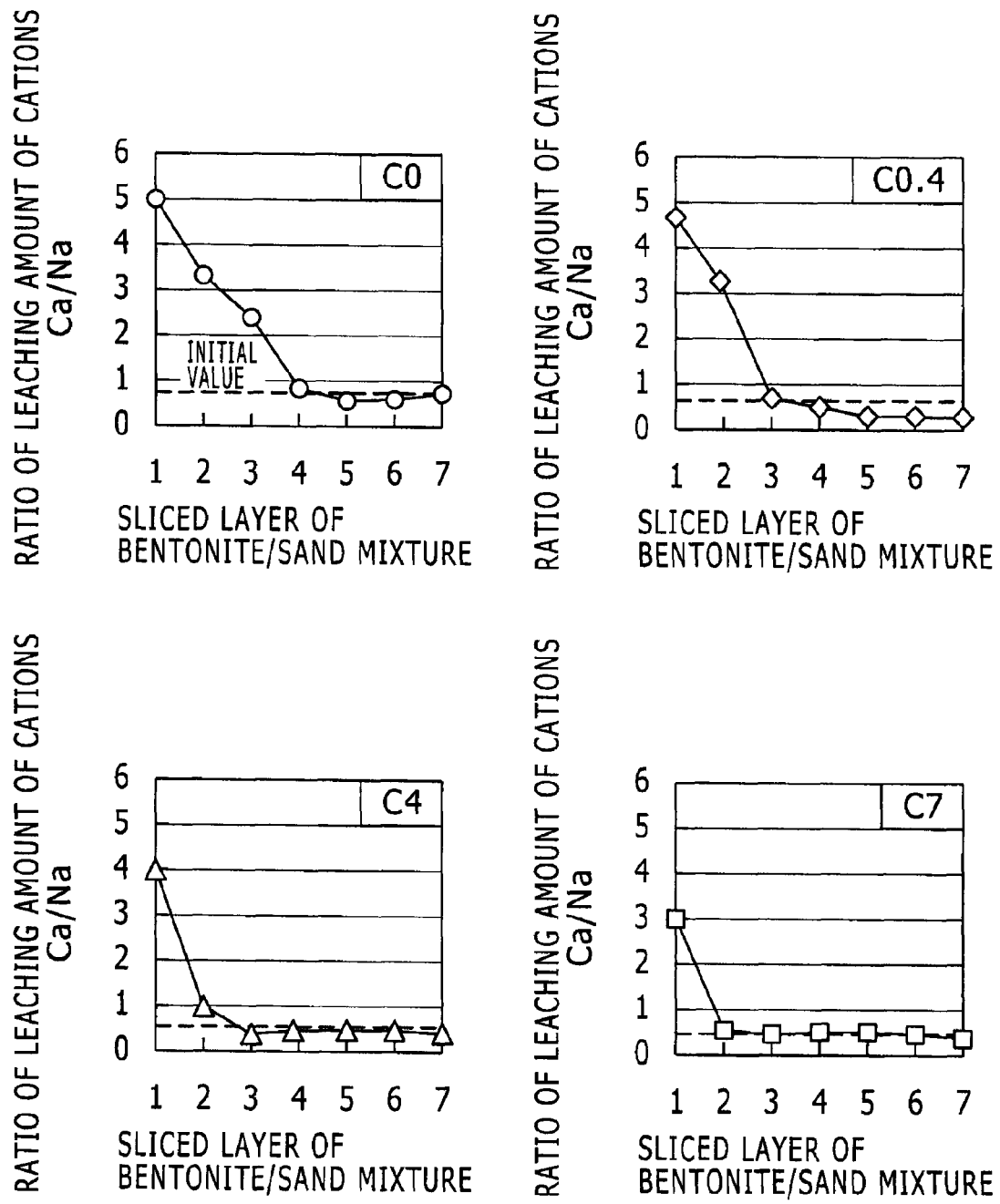
FIG. 5 is a graph showing the calcium ion-to-sodium ion ratio of the leaching amount of cations with respect to each layer of a bentonite/sand mixture specimen after electrophoresis-tested.

In FIG. 5, there is shown the calcium ion-to-sodium ion ratio of the leaching amount of cations. Broken lines in FIG. 5 indicate an initial value for each specimen, wherein there is shown a lower initial value with increasing NaHCO$_3$ mixing rate.

It may be considered that for all the specimens, the ratio of the leaching amount of cations is maximized in the first layer specified as the cement paste-side layer because of the influence of calcium ions leaching out from the cement paste. As compared with the initial values, the ratio of the leaching amount of cations is greater in the first to third layers for C0, in the first and second layers for C0.4 and in the first layer for C4 and C7, respectively, so that the range of the increase in ratio of the leaching amount of cations is narrowed with increasing NaHCO$_3$ mixing rate. This may be because mixing of NaHCO$_3$ results in not only the increase in sodium ion content in the bentonite/sand mixture but also the attainment of suppression of the amount of Ca leaching out from the cement paste.

(2) Swelling

Figure 6:
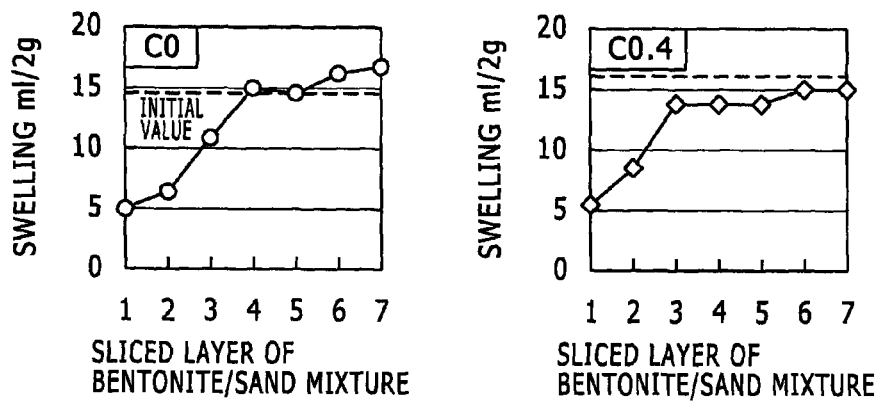
FIG. 6 is a graph showing the results of measurement on swelling with respect to each layer of the bentonite/sand mixture specimen after electrophoresis-tested.

In FIG. 6, there are shown the results of the measurement on the swelling for each layer of the bentonite/sand mixture before electrophoresis-tested. Broken lines in FIG. 6 indicate the swelling of each specimen before electrophoresis-tested, this swelling being used to denote an initial value of each specimen. C0, C0.4, C4 and C7 have an initial value of 14.3, that of 15.8, that of 14.8 and that of 14.0 ml/2 g, respectively.

As compared with the swelling before electrophoresis-tested, there were observations of 65, 54 and 23% reductions in swelling respectively in the first, second and third layers for C0, 65 and 46% reductions in the first and second layers for C0.4, and a 32% reduction in the first layer for C4. The layers where the remarkable reduction in swelling was observed have the higher ratio of the leaching amount of cations than 2 and show the tendency to conversion to the calcium type when using the ratio of the leaching amount of cations and the swelling as indexes. Meanwhile, as regards the range of the reduction in swelling, it is narrowed with increasing amount of NaHCO$_3$ mixed. Thus, for C7 (supersaturation) having the highest mixing rate, there was little observation of the reduction in swelling, irrespectively of the increase in ratio of the leaching amount of cations.

While it is found that the swelling tends to reduce with increasing ratio of the leaching amount of cations, it may be considered that mixing of NaHCO$_3$ allows the range of the appearance of such tendency to be narrowed, and mixing of NaHCO$_3$ at the supersaturation concentration makes it possible to substantially suppress the swelling reduction occurring with increasing ratio of the leaching amount of cations.

A-3 Conclusions

From the above experimental results, the followings were made known.

(1) From the results of thermal analysis on the cement paste after electrophoresis-tested, it is found that mixing of the sodium bicarbonate at the concentration exceeding the saturation concentration results in almost no change of the total Ca content, as compared with that before electrophoresis-tested.

(2) From the results of measurement on the swelling and that on the leaching amount of cations for the bentonite/sand mixture after electrophoresis-tested, it is found that mixing of NaHCO$_3$ makes it possible to narrow the range of the increase in leaching amount of cations and the range of the reduction in swelling. It is also found that mixing of NaHCO$_3$ at the concentration supersaturating the mixing water makes it possible to substantially suppress the swelling reduction occurring with increasing ratio of the leaching amount of cations.

(3) From (1) and (2) described the above, mixing of the sodium bicarbonate supposed to have the concentration supersaturating the mixing water with the bentonite/sand mixture in contact with the cement paste (the low diffusion layer) is considered to be effective in suppressing not only the leaching-out of calcium ions from the cement paste but also the conversion of the bentonite to the calcium type.

B. Experiment 2: Mixing of Sodium Carbonate (Comparison with Sodium Bicarbonate)

B-1 Outline of Experiment

Compared with the above Experiment 1 using NaHCO$_3$, Experiment 2 required the analysis on the effect (inclusive of the effect of maintaining the swelling) of suppressing not only the leaching-out of calcium ions from the cement paste but also the change in quality of the bentonite/sand mixture by mixing Na$_2$CO$_3$ containing more Na ions than NaHCO$_3$, in combination with the comparison with the effect obtained by mixing of NaHCO$_3$.

The preparation for the specimen and the basic experimental process are the same as those in Experiment 1, and thus, a description on the common details will be omitted.

Bentonite and sand in the composite specimen were mixed in the mass ratio of 7:3 like Experiment 1, wherein the mixing rate specified as the mass ratio of $NaHCO_3$ to bentonite was set at 1% (a specimen named C1) and 4% (a specimen named C4), and the mixing rate specified as the mass ratio of $Na_2CO_3$ to bentonite was set at 1% (a specimen named C'1), 4% (a specimen named C'4) and 12% (a specimen named C'12).

Table 6 lists the mixing rates, the concentrations and the Na and $CO_3$ ion contents of these specimens.

TABLE 6

| Specimen named | Type of mixture | Mixing rate (%) | Pour water concentration (g/l) | Na ion content (mol/l) | $CO_3$ ion content (mol/l) |
|---|---|---|---|---|---|
| C1 | $NaHCO_3$ | 1 | 26 | 0.31 | 0.31 |
| C4 | | 4 | 103 (Saturation) | 1.24 | 1.24 |
| C'1 | $Na_2CO_3$ | 1 | 25 | 0.47 | 0.24 |
| C'4 | | 4 | 100 | 1.89 | 0.94 |
| C'12 | | 12 | 300 (Saturation) | 5.66 | 2.83 |

Table 7 lists the testing periods and the integrated quantities of electricity at the time when the electrophoresis test is over.

TABLE 7

| Specimen named | Testing period (h) | Integrated quantity of electricity (kC) |
|---|---|---|
| C1 | 264 | 12.8 |
| C4 | 313 | 17.3 |
| C'1 | 264 | 12.2 |
| C'4 | 264 | 13.1 |
| C'12 | 264 | 8.9 |

After the electrophoresis test, the composite specimen was sliced into seven pieces of layers like Experiment 1 for the measurement on the cation content and that on the swelling for each layer of each specimen.

Figure 7:
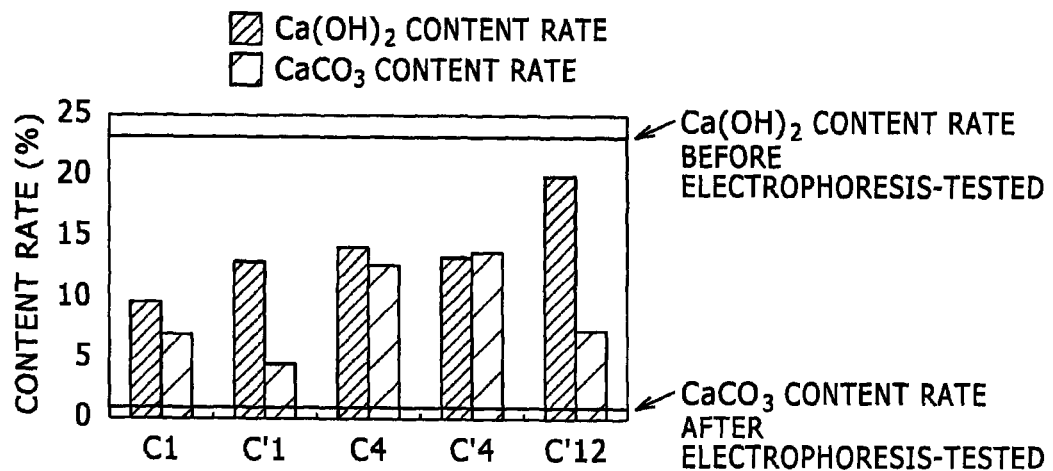
FIG. 7 is a bar graph showing the results of thermal analysis on an outermost layer part of the cement paste after electrophoresis-tested.

B-2 Experimental Results (1) Evaluation on Leaching-Out of Calcium Ions in Each Specimen In FIG. 7, there are shown the results of thermal analysis on an outermost layer of the cement paste after electrophoresis-tested, wherein the rates of $Ca(OH)_2$ and $CaCO_3$ contents to the sample mass at 800° C. are presented.

Figure 8:
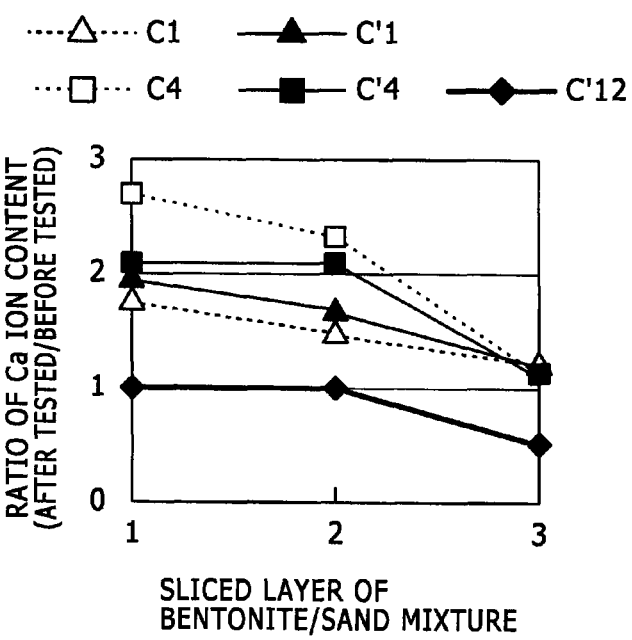
FIG. 8 is a graph showing the ratio of $Ca^{2+}$ content before tested to that after tested with respect to the first to third layers producing the pronounced influence of leaching-out of Ca among the layers of the bentonite/sand mixture.

In FIG. 8, there is shown the ratio of $Ca^2$% content before tested to that after tested for the first to third layers producing the pronounced influence of leaching-out of Ca among the layers of the bentonite/sand mixture.

It is seen from the results of thermal analysis that C'12 results in less reduction in Ca $(OH)_2$ content rate because of the still existence of 80% or above of the $Ca(OH)_2$ content to that before tested, except other specimens where the reduction in $Ca(OH)_2$ content rate to about the half or below was observed.

It is noted that from the results of EPMA analysis (which is to analyze elements contained in a sample by applying irradiation of accelerated electron rays to the sample to detect generated characteristic X-rays), there was no observation of the reduction in Ca concentration in the outermost layer of the cement paste, whereas the increase in $CO_2$ concentration was observed in an extremely narrow range. There was no observation of the increase in $Ca^{2+}$ content in the outermost layer of the bentonite/sand mixture too. That is, it may be considered that the suppression of the leaching-out was achieved with a thin and dense $CaCO_3$ membrane formed on the outermost layer of the cement paste.

Meanwhile, for C4 and C'4, there was observation of the increase in $CaCO_3$ content rate in the cement paste, as well as the increase in $Ca^{2+}$ content in the first and second layers of the bentonite/sand mixture, and it is thus considered that the leaching-out has progressed to some extent.

This may be because $CaCO_3$, although having been formed in the outermost layer area of the cement paste, became precipitated at the low concentration over a wide range, and therefore, could not have the sufficient effect of suppressing the leaching-out. For C1 and C'1, while there was observation of less increase in $CaCO_3$ content rate as compared with the specimen having the mixing rate of 4%, the increase in $Ca^{2+}$ content was observed in the first and the second layers of the bentonite/sand mixture, and it is thus considered that the leaching-out has progressed to some extent.

The comparison between mixing of $NaHCO_3$ and mixing of $Na_2CO_3$, when made with respect to the mixing rates of 1 and 4%, results in no great difference.

(2) Evaluation on Swelling of Each Specimen

Figure 9:
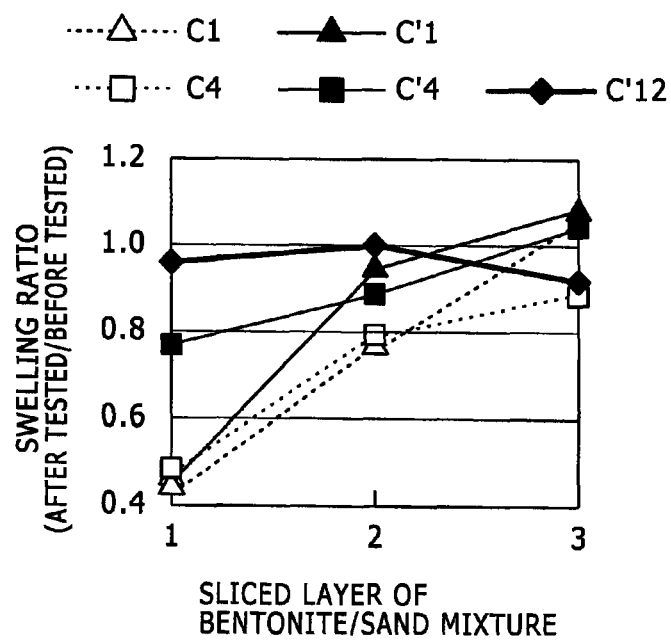
FIG. 9 is a graph showing the ratio of swelling before tested to that after tested with respect to the first to third layers producing the pronounced influence of leaching-out of Ca among the layers of the bentonite/sand mixture.
Figure 10:
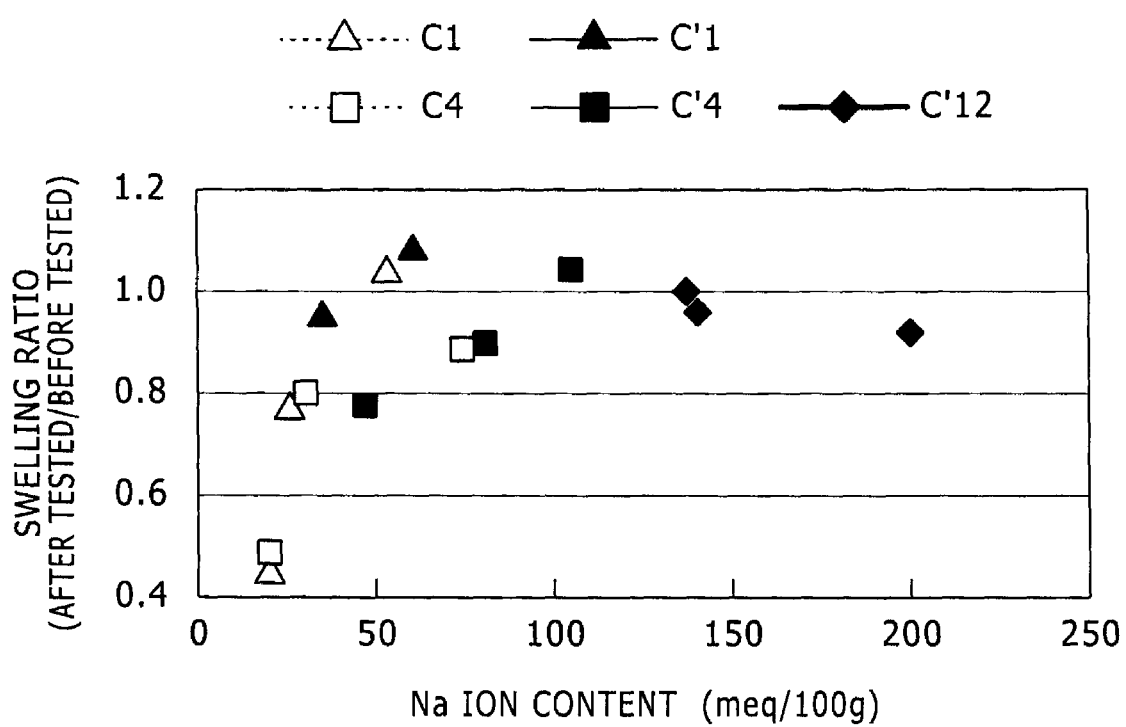
FIG. 10 is a graph showing the relation between the $Na^+$ content and the ratio of swelling before tested to that after tested with respect to the first to third layers of the bentonite/sand mixture.

In FIG. 9, there is shown the swelling ratio in the first to third layers producing the pronounced influence of leaching-out of Ca among the layers of the bentonite/sand mixture. In FIG. 10, there is shown the relation between the $Na^+$ content in the first to third layers of the bentonite/sand mixture and the swelling ratio. In these FIGURES, the swelling ratio specified as a value obtained by dividing the swelling of the bentonite/sand mixture after electrophoresis-tested by the swelling before electrophoresis-tested is presented.

It is seen that on the side of the cement paste surface in contact with the bentonite/sand mixture, there was no observation of the reduction in swelling ratio for C'12 where the leaching-out has little progressed. It is also seen that for C'4, the suppression of the reduction in swelling ratio was attained. From FIG. 10, it is suggested that the more effective suppression of the reduction in swelling ratio would be attainable with increasing $Na^+$ content. It may be thus considered that mixing of $Na_2CO_3$ having more $Na^+$ content than $NaHCO_3$ results in more effective suppression of the reduction in swelling performance of the bentonite/sand mixture.

(3) Conclusions

From Experiment 2, the following knowledge was obtained.

In cases where the $Na_2CO_3$ mixing rate was set at 12% supposed to provide the saturation concentration, the leaching-out from the cement paste and the reduction in swelling of the bentonite/sand mixture were both substantially suppressed.

Mixing of $Na_2CO_3$ having more $Na^+$ ions than $NaHCO_3$ with the bentonite permits less reduction in swelling of the bentonite/sand mixture.

C. Knowledge Resulting from Experiments 1 and 2

(1) It is desirable to mix $NaHCO_3$ at the concentration supersaturating the mixing water of the bentonite-based material in order to use $NaHCO_3$ for effectively suppressing not only the leaching-out of calcium ions from the cement-based material of the low diffusion layer but also the reduction in swelling due to the change in quality of the bentonite.

(2) It is desirable to mix $Na_2CO_3$ at the concentration exceeding the saturation concentration in the mixing water of the bentonite-based material in order to use $Na_2CO_3$ for effectively suppressing not only the leaching-out of calcium ions from the cement-based material of the low diffusion layer but also the reduction in swelling due to the change in quality of the bentonite.

(3) While some differences do exist depending on the amount mixed, it can be appreciated that the object of the present invention would be attainable by mixing of either $NaHCO_3$ or $Na_2CO_3$.

INDUSTRIAL AVAILABILITY

The present invention is applicable as the artificial multi-barrier to the radionuclide leak from the radioactive waste in the radioactive waste disposal/keeping structure intended for the low-level radioactive waste subsurface-disposal treatment facilities.

The invention claimed is:

1. An artificial multi-barrier for a radioactive waste treatment facility wherein a low diffusion layer consisting of cement-based material is arranged on the outside of a concrete pit housing radioactive waste, and a low water-permeability layer provided in the form of a compacted layer consisting of a mixture of sodium-type bentonite and sand at 10 to 70% by weight of said bentonite, said sand having a grain diameter of maximally 1.2 mm or less and further containing sodium bicarbonate or sodium carbonate so as to obtain a dry density of 1.6 g/cm$^3$ or above and permeability of $1.0\times10^{-12}$-m/s or below is arranged in contact with the outside of said low diffusion layer, said artificial multi-barrier being characterized by providing mixing the sodium bicarbonate or sodium carbonate with constituents of said low water-permeability layer so that in case of the leaching-out of calcium ions from the cement-based material of said low diffusion layer, said calcium ions are made to react with the sodium bicarbonate or sodium carbonate mixed with the constituents of said low water-permeability layer so that a calcium ion-diffusion barrier layer having calcium carbonate as its main component is formed in the vicinity of the interface between said low diffusion layer and said low water-permeability layer, wherein a back-filling layer consisting of refilling material having excavated earth and sand as its main component and permitting cement to be held therein is arranged in contact with the outside of said low water-permeability layer so that in case of the leaching-out of calcium ions from said back-filling layer, said calcium ions are made to react with the sodium bicarbonate or sodium carbonate mixed with the constituents of said low water-permeability layer so that a barrier layer having calcium carbonate as its main component is formed also in the vicinity of the interface between said low water-permeability layer and said back-filling layer, and wherein only a layer of said low water-permeability layer in the vicinity of the interface between said low water-permeability layer and said low diffusion layer and/or said back-filling layer comprises sodium bicarbonate or sodium carbonate of a high concentration or supersaturation concentration, while an inner layer or layers thereof comprises no sodium bicarbonate or sodium carbonate or otherwise have it of a lower concentration.

2. The artificial multi-barrier for a radioactive waste treatment facility according to claim 1, wherein said low water-permeability layer is in the form of a compacted layer consisting of a sodium-type bentonite, sand, and mixing water mixture containing the sodium bicarbonate or sodium carbonate.

3. The artificial multi-barrier for a radioactive waste treatment facility according to claim 2, wherein said sodium bicarbonate, when used, is mixed at a concentration supersaturating the mixing water for use in forming said low water-permeability layer, or said sodium carbonate, when used, is mixed at a concentration exceeding the saturation concentration of said mixing water.

4. The artificial multi-barrier for a radioactive waste treatment facility according to claim 3, wherein said low water-permeability layer has said sodium bicarbonate or sodium carbonate, at least part of which being mixed in the form of powder so as to have, in the vicinity of the interface between said low water-permeability layer and said low diffusion layer and/or said back-filling layer, the concentration supersaturating said mixing water for use in forming said low water-permeability layer.

5. The artificial multi-barrier for a radioactive waste treatment facility according to claim 4, wherein fillers consisting of inorganic fine powders for use in providing a densified texture are held in said low diffusion layer and/or said back-filling layer.

6. The artificial multi-barrier for a radioactive waste treatment facility according to claim 1, wherein said low water-permeability layer is in the form of a compacted layer consisting of a sodium-type bentonite/sand/mixing water mixture containing the sodium bicarbonate or sodium carbonate.

7. The artificial multi-barrier for a radioactive waste treatment facility according to claim 6, wherein said sodium bicarbonate, when used, is mixed at a concentration supersaturating the mixing water for use in forming said low water-permeability layer, or said sodium carbonate, when used, is mixed at a concentration exceeding the saturation concentration of said mixing water.

8. The artificial multi-barrier for a radioactive waste treatment facility according to claim 7, wherein said low water-permeability layer has said sodium bicarbonate or sodium carbonate, at least part of which being mixed in the form of powder so as to have, in the vicinity of the interface between said low water-permeability layer and said low diffusion layer and/or said back-filling layer, the concentration supersaturating said mixing water for use in forming said low water-permeability layer.

9. The artificial multi-barrier for a radioactive waste treatment facility according to claim 8, wherein fillers consisting of inorganic fine powders for use in providing a densified texture are held in said low diffusion layer and/or said back-filling layer.

10. The artificial multi-barrier for a radioactive waste treatment facility according to claim 1, wherein said sodium bicarbonate, when used, is mixed at a concentration supersaturating a mixing water for use in forming said low water-permeability layer, or said sodium carbonate, when used, is mixed at a concentration exceeding the saturation concentration of said mixing water.

11. The artificial multi-barrier for a radioactive waste treatment facility according to claim 10, wherein said low water-permeability layer has said sodium bicarbonate or sodium carbonate, at least part of which being mixed in the form of powder so as to have, in the vicinity of the interface between said low water-permeability layer and the low diffusion layer at least containing cement or consisting of the cement-based material, the concentration supersaturating said mixing water for use in forming said low water-permeability layer.

12. The artificial multi-barrier for a radioactive waste treatment facility according to claim 11, wherein said radioactive waste includes low-level radioactive waste.

* * * * *